United States Patent
Browne

(10) Patent No.: US 6,257,752 B1
(45) Date of Patent: Jul. 10, 2001

(54) WHISK WITH WIRE LOOPS COVERED WITH SILICON TUBING

(75) Inventor: Peter Browne, Markham (CA)

(73) Assignee: Browne & Co. Ltd. (CA)

( * ) Notice: Subject to any disclaimer, the term of this patent is extended or adjusted under 35 U.S.C. 154(b) by 0 days.

(21) Appl. No.: 09/525,624

(22) Filed: Mar. 14, 2000

(30) Foreign Application Priority Data

Mar. 8, 2000 (CA) .................................................. 2300551

(51) Int. Cl.[7] .............................. B01F 13/00; A47J 43/10
(52) U.S. Cl. .......................................... 366/129; 416/70 R
(58) Field of Search .............................. D7/376–380, 412, D7/688, 690; 416/69, 70 R, 72, 76–77, 230, 240, 241 R, 241 A; 15/141.1, 141.2; 99/348; 366/129, 130, 342–344, 325.6, 326.1

(56) References Cited

U.S. PATENT DOCUMENTS

| | | |
|---|---|---|
| 477,388 | 6/1892 | Shaw . |
| 500,059 | 6/1893 | Forsyth, Jr. . |
| 1,579,382 * | 4/1926 | Mitchell . |
| 1,910,302 | 5/1933 | Maslow . |
| 3,039,457 | 6/1962 | Boudkevitch et al. . |
| 3,202,542 * | 8/1965 | Poje . |
| 4,735,510 | 4/1988 | Barbour et al. . |

FOREIGN PATENT DOCUMENTS

99/15060 * 4/1999 (WO) .

* cited by examiner

Primary Examiner—Ana Fortuna
Assistant Examiner—Richard W. Ward
(74) Attorney, Agent, or Firm—Mark Kusner

(57) ABSTRACT

A wire whisk that is safe for use on non-stick cookware with an array of flexible wire loops, each loop having two ends secured to the inner end of the handle. The whisk has silicone tubing surrounding each wire loop to render it heat resistant but non-abrasive for use on non-stick coating surfaces. Silicone tubing together with internal wire loops preserves the superior whipping action of flexible wire with the non-stick non-abrasive properties of a silicone surface. The wire loops and associated tubing may be disposed in any conventional whisk configuration such as that of a piano whisk; an egg whisk; a flat whisk; a balloon whisk; or a Swedish style/helical wire configuration.

3 Claims, 1 Drawing Sheet

WHISK WITH WIRE LOOPS COVERED WITH SILICON TUBING

TECHNICAL FIELD

The invention relates to an improved wire kitchen utensil, such as a whisk, pastry blender or wire potato masher, with non-stick heat-resistant resilient silicone tubing surrounding flexible wire loops.

BACKGROUND OF THE ART

The invention is applicable to a number of kitchen implements which are used in contact with foods and especially foods contained within non-stick coated vessels. For example, whisks, pastry blenders, and potato mashers are often constructed of stainless steel wires attached to a handle. The wires in contact with the food and with the interior of a bowl or vessel can abrade the non-stick coating, interior coating or finish. Although, the present description relates primarily to a whisk, it will be understood that any kitchen implement constructed of wire, where the wires are used in contact with the food itself, can benefit from application of the invention.

A whisk is a common kitchen utensil, that is used for hand beating of food preparations such as eggs, creams, oils, sauces, cooked vegetables etc. A metal whisk is usually fabricated from a number of loops of wire that are retained in a handle. The whisk handle is grasped and the whisk wires are moved in a closed circular path to beat the food preparation mixing, blending, smoothing and entraining air.

Stainless steel wire loops are generally preferred as whisking elements due to their superior strength, durability and resilient whipping action, as well as ease of cleaning and simple fabrication. The whisk can have a very long service life since the metal whisk loops rarely break, wear or corrode. However, with the introduction of non-stick coatings, porcelain cooking pots, glazed finishes and other susceptible coatings, traditional metal wire whisks can result in damage due to the abrasion or impact of the metal whisk loops against the interior of the bowl causing scratches, chips, removal of the relatively soft coating, or breakdown of the interior surface of the vessel. Plastic whisks or wooden whisks are much less durable than a metal whisk loop and tend to break apart or absorb moisture which is highly undesirable and unsanitary. Plastic coated metal whisk loops are prone to wear away or melt under extreme heat. Plastic utensils also lack the durability and reliability necessary for commercial adoption. A broken whisk element or other part of a broken utensil found in food is very undesirable and damaging to the reputation of a restaurant. Especially in a commercial environment, kitchen utensils that are unreliable will be quickly discarded and professional cooks are very hesitant to experiment with new materials that may result in a decrease in productivity or reduce food quality in any way.

Common configurations of whisks include a so-called French whisk which has relatively heavy wires in a teardrop shape with ends secured in a handle. A French whisk is used for heavy consistency materials such as batters, thick sauces or for mashing cooked vegetables. A balloon whisk has a wire loop configuration with a generally spherical end used for aerating light foamy mixtures such as egg whites, soufflés, meringues, or whipped cream where additional air is required to ensure the quality of food preparation. A flat or roux whisk comprises teardrop shaped loops in a flat configuration which is used for de-glazing pans, mixing roux in a flat pan or for gently folding in cream two mixtures. Further, a Swedish style or helical wire whisk comprises a loop of relatively heavy wire having thinner loop of wire wrapped in a helical pattern around the heavy wire.

Whisk loops of any of the above common configurations are permanently formed and securely attached to the whisk handle. Due to rugged construction, the whisk loops of resilient stainless steel are generally unbreakable in regular use situations.

Unfortunately, however use of a metal wire whisk in a Teflon or non-stick coated bowl, or a ceramic bowl can result in significant damage to the bowl finish while the whisk remains undamaged.

Apart from durability, most cooks prefer to use a wire whisk since it produces a superior result in less time than the alternatives currently available such as plastic loop whisks.

It is an object of the invention to provide a whisk or other kitchen utensil which combines the superior productivity and reliability of a wire loop whisk with the desirable properties of low abrasion for use in association with non-stick coatings.

Further objects of the invention will be apparent from review of the disclosure and description of the invention below.

DISCLOSURE OF THE INVENTION

The invention relates to an improved wire kitchen utensil, such as a whisk, pastry blender or wire potato masher, that is safe for use on non-stick cookware with an array of flexible wire loops, each loop having two ends secured to the inner end of the handle. The whisk has resilient silicone tubing surrounding each wire loop to render it heat resistant but non-abrasive for use on non-stick coating surfaces. Silicone tubing together with internal wire loops preserves the superior whipping action of flexible wire with the non-stick non-abrasive properties of a silicone surface.

In contrast, nylon or plastic utensils are generally not heat resistant or durable enough for use in a demanding commercial kitchen environment. The high strength, low weight and superior resilience of metal wire whisks make these simple utensils a standard component of commercial and domestic kitchens. Plastic whisks do not have the same whisking action, are less durable and are prone to breakage which may ruin an entire batch of food being mixed. Merely coating metal utensils with non-stick or nonabrasive coatings has also proven to be lacking in the necessary durability and heat resistance.

The silicone tubing is secured at its ends but free to rotate or twist in the mid-portion. Whipping of the wire loops through liquid creates a resilient reciprocating torsional motion of the silicone tube which adds local turbulence to the liquid and increases air entrainment in the liquid foam.

Advantageously, the silicone tubing may be colour coded as a visual symbol to indicate exclusive reservation for use in the preparation of a predetermined food group. Whipped cream for example readily absorbs favour from minute traces of other foods, and the presence of a small amount of oil on a whisk may impede development of foam from cream or egg whites by detrimentally altering the surface tension of the liquid bubbles.

The coloured silicone tubing also serves to visually warn users if the tubing breaks off since the shiny metal loops are clearly visible in contrast to the coloured silicone tubing. Silicone is inert and will not create toxicity in the event that any dislodged tubing mixes into the food being prepared.

The silicone tubing is relatively soft and reduces the noise associated with whipping or whisking especially in metal bowls. The wire loops and associated tubing may be disposed in any conventional whisk configuration such as that of a piano whisk; an egg whisk; a flat whisk; a balloon whisk; or a Swedish style/helical wire configuration.

Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawings wherein.

DETAILED DESCRIPTION OF PREFERRED EMBODIMENTS

Figure 1:
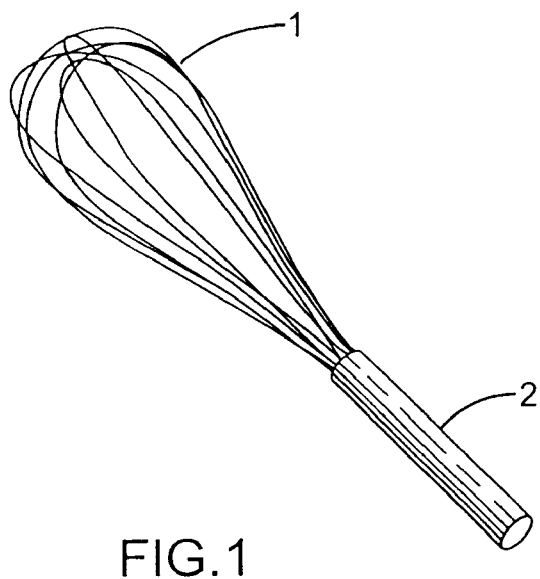
FIG. 1 shows a whisk of conventional piano/egg/French configuration with the additional of resilient silicone tubing to the exterior of each flexible wire loop of the whisk.
Figure 3:
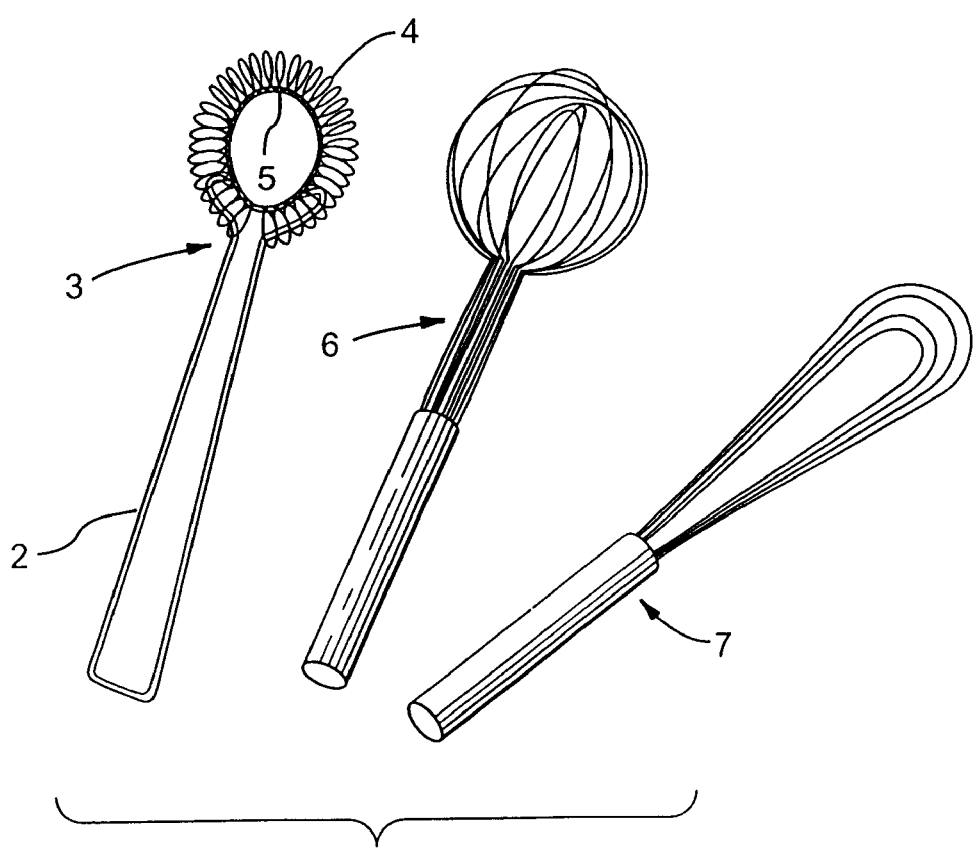
FIG. 3 shows alternative whisk configurations namely from left to right, a helical/Swedish style whisk, a balloon whisk, and a flat whisk.

FIG. 1 shows a whisk of conventional configuration commonly known as a piano, egg or French configuration. The difference between these three types is not in the general appearance but rather in the thickness, resilience and number of teardrop shaped loops 1 of flexible wire, each loop having two ends secured to the inner end of the handle 2. FIG. 3 shows other common configurations of whisks. To the extreme left is a helical or Swedish style whisk 3 with a wire loop 1 of helical configuration 4 encircling a relatively heavy inner support loop 5. A balloon whisk 6 is of the same general configuration as the piano whisk shown in FIG. 1 except that the shape of the wire loops form a spherical end for superior air entrainment in light mixtures.

A flat or roux whisk 7 also has a similar configuration to the piano whisk shown in FIG. 1 with the exception that the wire elements are arranged in a generally flat plane for use of the whisk in contact with a flat pan bottom.

Figure 2:
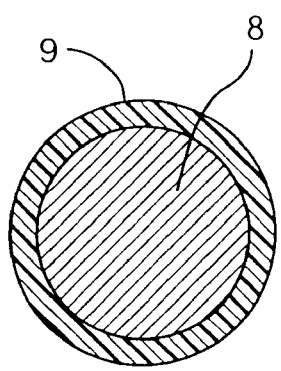
FIG. 2 is a cross-sectional view through a typical wire showing a solid wire metal core and a flexible silicone tubing covering the exterior of the wire.

FIG. 2 shows a cross sectional view through the whisk loops 1 of any of the whisks described above. The cross-sectional view shows a typical solid wire metal core 8 preferably of stainless steel wire. Covering the complete exterior of the wire core 8 is a flexible silicone tube 9. Other resilient tubing may be suitable however the preferred material for the tubing 9 is silicone due to its capacity for high heat resistance, wear capacity and inert chemical structure.

In order to retain the flexible whipping action of the wire core 8, the wall thickness of the silicone tubing 9 cannot be extremely thick and to retain the wear resistance properties within the reasonable limit, the silicone tubing wall thickness cannot be extremely thin. Through experimentation, the inventor has determined that silicone tubing should have a wall thickness in the range between 0.1 to 1.0 millimeters, ideally. Depending on the specific material properties however the thickness of silicone tubing 9 walls may vary considerably.

It has also been found that the tubing 9 and wire 8 may be secured together to inhibit all axial and rotational relative displacement. By securing the tubing 9 and wire 8 together, the possibility of wear between the wire 8 and interior surface of the tubing 9 is eliminated.

However, it has been found that the preferred method of manufacturing involves securing the tubing 9 and wire 8 relative to each other to prevent or inhibit relative axial displacement but to permit relative rotational sliding displacement. During manufacture, the tubing 9 is slipped over the wire 8 external surface and no bonding occurs between the wire 8 and tubing 9. During use in preparing foods, the resilient tubing 9 is passed through a liquid at high speed in a whipping action, resulting in torsional winding or twisting of the flexible tube 9 on the metal core 8. When motion of the whisking elements stops, the resilient tube 9 springs back torsionally to its original position. Therefore, it has been found that superior whipping action results from the twisting and untwisting of the silicone tube 9 on the wire 8 as the wire 8 is whipped through liquids at high speed.

In addition, the flexible silicone tubing 9 prevents contact between abrasive metal wire 8 and the interior coated surfaces of various cooking vessels. The silicone tubing 9 is heat resistant, non-abrasive, and serves to reduce the noise resulting from contact between the whisking elements and the interior of vessels.

Advantageously, the silicone tubing 9 can be produced in any number of colours to visually provide a symbol that indicates the whisk is to be used exclusively for the preparation of certain food groups. For example, whipping cream is very prone to absorb trace flavours from other foods. The presence of oil on utensils tends to inhibit the foaming of egg whites and whipping cream. As well, the presence of trace amounts of spices or flavours on kitchen utensil may detrimentally effect the flavour of other food groups. Colouring of tubing also may indicate ownership or indicate the cooking station to which the utensil should be returned after washing.

Although the above description and accompanying drawings relate to a specific preferred embodiment as presently contemplated by the inventor, it will be understood that the invention in its broad aspect includes mechanical and functional equivalents of the elements described and illustrated.

The embodiments of the invention in which an exclusive property or privilege is claimed are defined as follows:

1. A whisk comprising:
   a handle having an inner and an outer end;
   at least one flexible wire loop, each loop having two ends secured to the inner end of the handle; and
   resilient silicone tubing surrounding each wire loop, said silicone tubing and wire being secured together such that axial displacement of the tubing relative to the wire is inhibited, and rotational displacement of the silicone tubing relative to the wire is enabled, permitting enhanced whipping action from a twisting and untwisting of the silicone tubing as each loop is whipped through liquids at high speeds;
   wherein the wire loops and associated tubing are disposed in a whisk configuration selected from the group consisting of: a piano whisk configuration; an egg whisk configuration; a flat whisk configuration; a balloon whisk configuration; and a helical wire configuration.

2. A whisk according to claim 1 wherein the silicone tubing has a wall thickness of between 0.1 to 1.0 mm.

3. A whisk according to claim 1 wherein the tubing is coloured as a visual symbol to indicate exclusive reservation for use in the preparation of a predetermined food group.

* * * * *